UNITED STATES PATENT OFFICE.

WILLIAM KIEL, OF BUTLER, NEW JERSEY, ASSIGNOR TO KIEL, BUTLER & TURNBULL, OF NEW YORK, N. Y.

PROCESS OF MANUFACTURING VULCANIZED PLASTIC COMPOUNDS.

SPECIFICATION forming part of Letters Patent No. 412,267, dated October 8, 1889.

Application filed January 19, 1889. Serial No. 296,920. (Specimens.)

*To all whom it may concern:*

Be it known that I, WILLIAM KIEL, a citizen of the United States, residing at Butler, in the county of Morris, in the State of New Jersey, have invented an improved process of manufacturing vulcanized plastic compounds into which wood enters as an ingredient in large quantities, (for which compounds I have filed simultaneously herewith an application for Letters Patent,) of which the following is a specification.

My new process enables me to produce very superior vulcanized plastic compounds, which if vulcanized so as to produce a hard substance can be used to great advantage in the place of hard rubber, whalebone, ivory, and even wood, and which if vulcanized so as to produce a soft substance can be used to take the place of soft rubber and its compounds, and which possess in each case very superior qualities.

My invention consists in dissolving in benzine or other solvent any quantity of crude rubber. To this I add wood in a convenient form in any quantity up to ten times the original weight of the crude rubber. I then evaporate the solvent and obtain a mass which I mix with crude rubber, sulphur, oil, and beeswax upon heated rollers. The compound thus obtained is ready for vulcanization.

For the purpose of applying my invention, I saw or otherwise convert the wood into some convenient form, and from the particles of the wood I remove any moisture by artificial or other means, and, if necessary, wash out any acids that may be in them. I preferably use crude rubber which has been washed and dried.

In the application of this process to the manufacture of vulcanized plastic compounds it will not be necessary to add to the mass above described crude rubber if the quantity of wood particles mixed with the dissolved crude rubber is not greater in weight than the weight of the crude rubber used. The quantity of sulphur, oil, and beeswax with which the mass above described is mixed will vary, as occasion may require. I use beeswax in small quantities, its presence giving to the vulcanized finished compound increased toughness.

The time and the pressure applied in the process of vulcanizing hard rubber will if applied here produce a hard compound. In like manner the time of vulcanization and the pressure applied in the process of manufacturing soft rubber will if applied here produce a soft substance; but I do not confine myself to the limits within which these respective processes vary.

I do not claim the vulcanized plastic compounds which are the product of the herein-described process, as I have filed simultaneously herewith an application for Letters Patent for those compounds, and I do not limit myself to any particular proportions, as I may vary them as occasion may require; but What I do claim, and desire to secure by Letters Patent, is—

1. The herein-described process of manufacturing vulcanized plastic compounds of which wood is a constituent part by mixing wood with crude rubber dissolved by any solvent and subsequently combining by vulcanization the product thus obtained with sulphur, oil, and beeswax, substantially as described.

2. The herein-described process of manufacturing vulcanized plastic compounds of which wood is a constituent part by mixing wood with crude rubber dissolved by any solvent and subsequently combining by vulcanization the product thus obtained with sulphur, oil, beeswax, and crude rubber, substantially as described.

WILLIAM KIEL.

Witnesses:
SHERMAN EVARTS,
THOMAS HUNT.